(12) United States Patent
Glotin et al.

(10) Patent No.: US 11,685,125 B2
(45) Date of Patent: Jun. 27, 2023

(54) METHOD FOR WELDING PARTS MADE OF THERMOPLASTIC MATERIAL

(71) Applicants: ARKEMA FRANCE, Colombes (FR); INSTITUT DE SOUDURE, Villepinte (FR)

(72) Inventors: Michel Glotin, Saint Cloud (FR); Jean-Pierre Cauchois, Nancy (FR); Aurélien Philippe, Volstroff (FR); Philippe Klein, Roubling (FR)

(73) Assignees: ARKEMA FRANCE, Colombes (FR); INSTITUT DE SOUDRE, Villepinte (FR)

( * ) Notice: Subject to any disclaimer, the term of this patent is extended or adjusted under 35 U.S.C. 154(b) by 96 days.

(21) Appl. No.: 17/261,008

(22) PCT Filed: Jul. 16, 2019

(86) PCT No.: PCT/FR2019/051775
§ 371 (c)(1),
(2) Date: Jan. 16, 2021

(87) PCT Pub. No.: WO2020/016514
PCT Pub. Date: Jan. 23, 2020

(65) Prior Publication Data
US 2022/0266537 A1 Aug. 25, 2022

(30) Foreign Application Priority Data

Jul. 16, 2018 (FR) .................................. 1856537
May 17, 2019 (FR) .................................. 1905222
May 17, 2019 (FR) .................................. 1905223

(51) Int. Cl.
B29C 65/32 (2006.01)
B29C 65/08 (2006.01)
(Continued)

(52) U.S. Cl.
CPC .............. B29C 65/32 (2013.01); B29C 65/08 (2013.01); B29K 2071/00 (2013.01);
(Continued)

(58) Field of Classification Search
None
See application file for complete search history.

(56) References Cited

U.S. PATENT DOCUMENTS 4,175,998 A 11/1979 Boruszewski et al.
4,608,103 A 8/1986 Aldrich
(Continued)

FOREIGN PATENT DOCUMENTS

CN 103987510 A 8/2014
DE 1629160 A1 1/1971
(Continued)

OTHER PUBLICATIONS

"Thickness of Aluminum Foil." U.S. Packaging & Wrapping LLC., Nov. 6, 2016, web.archive.org/web/20161106115238/https://uspackagingandwrapping.com/blog/thickness-of-aluminum-foil.html. (Year: 2016).*
(Continued)

Primary Examiner — Alison L Hindenlang
Assistant Examiner — Andrés E. Behrens, Jr.
(74) Attorney, Agent, or Firm — Buchanan Ingersoll & Rooney P.C.

(57) ABSTRACT

A method for welding at least two parts including a thermoplastic material and having respective surfaces to be welded, including: inserting an insert between the surfaces to be welded of the two parts; generating heat via the insert; wherein the insert moves in relation to the parts to be welded in a welding direction. Also, an installation adapted for implementation of this method.

13 Claims, 9 Drawing Sheets

(51) Int. Cl.
  B29C 65/00 (2006.01)
  B29C 65/46 (2006.01)
  B29C 65/14 (2006.01)
  B29C 65/04 (2006.01)
  B29C 65/30 (2006.01)
  B29K 71/00 (2006.01)
  B29K 105/20 (2006.01)
  B29K 307/04 (2006.01)
  B29K 309/08 (2006.01)
  B29L 31/30 (2006.01)

(52) U.S. Cl.
  CPC ...... *B29K 2105/20* (2013.01); *B29K 2307/04* (2013.01); *B29K 2309/08* (2013.01); *B29K 2995/0097* (2013.01); *B29L 2031/3082* (2013.01)

(56) References Cited

U.S. PATENT DOCUMENTS

| | | | | |
|---|---|---|---|---|
| 4,704,509 | A * | 11/1987 | Hilmersson | B29C 66/72321 219/673 |
| 4,978,825 | A | 12/1990 | Schmidt et al. | |
| 5,313,034 | A * | 5/1994 | Grimm | B29C 66/8362 219/777 |
| 5,753,068 | A | 5/1998 | Mittleider | |
| 5,756,580 | A * | 5/1998 | Natori | C08F 297/02 525/100 |
| 5,902,935 | A | 5/1999 | Georgeson et al. | |
| 5,948,513 | A * | 9/1999 | Turnbull | B32B 27/32 428/339 |
| 6,229,127 | B1 * | 5/2001 | Link | B29C 66/8122 219/650 |
| 6,323,468 | B1 | 11/2001 | Dabelstein et al. | |
| 2004/0247828 | A1 * | 12/2004 | Brozenick | B29C 66/41 156/92 |
| 2014/0124125 | A1 | 5/2014 | Nussbaum et al. | |
| 2014/0326411 | A1 * | 11/2014 | Konita | B29C 35/045 156/583.1 |
| 2019/0389144 | A1 | 12/2019 | Wadsworth | |

FOREIGN PATENT DOCUMENTS

| | | |
|---|---|---|
| DE | 4421016 A1 | 12/1995 |
| DE | 102012020839 A1 | 4/2014 |
| EP | 0720908 A1 | 10/1996 |
| EP | 0720906 B1 | 1/2001 |
| EP | 1849581 A1 | 10/2007 |
| EP | 2150393 B1 | 6/2012 |
| EP | 2801472 A1 | 11/2014 |
| EP | 2907651 B1 | 5/2018 |
| FR | 2488828 A1 | 2/1982 |
| FR | 3017562 | 2/2014 |
| FR | 3083732 A1 | 1/2020 |
| FR | 3083733 A1 | 1/2020 |
| FR | 3083734 A1 | 1/2020 |
| GB | 2082500 A | 3/1982 |
| JP | 64-087328 A | 3/1989 |
| WO | 2008087194 A2 | 7/2008 |
| WO | 2008133507 A2 | 11/2008 |
| WO | 2012158293 A1 | 11/2012 |
| WO | 2013110270 A1 | 8/2013 |
| WO | 2015140270 A1 | 9/2015 |
| WO | 2020016514 A1 | 1/2020 |

OTHER PUBLICATIONS https://web.archive.org/web/20180413074430/https://en.wikipedia.org/wiki/Polyolefin (Year: 2018).*
https://web.archive.org/web/20180413074415/https://en.wikipedia.org/wiki/Polyethylene (Year: 2018).*
Search Report, Application No. RU 2021103594, dated Jul. 7, 2021, 5 pages.
Office Action, Application No. RU 2021103594, dated Jul. 8, 2021, 16 pages.
Examination Report, Application No. IN 202147001299, dated Jul. 31, 2021, 6 pages.
Office Action dated Mar. 15, 2022 for Chinese Application No. 201980047570.7.
International Search Report and Written Opinion, PCT/FR2019/051775, dated Nov. 6, 2019.
Misugi Hongoh et al, "Temperature Rise and Welding Characteristics of Various-Frequency Ultrasonic Plastic Welding Systems", Japanese Journal of Applied Physics, vol. 45, No. 5B, May 1, 2006, pp. 4806-4811, XP055344927, JP, ISSN: 0021-4922, DOI: 10.1143/JJAP.45.4806.
Institut National de la Propriete Industrielle Preliminary Search Report dated Jul. 23, 2020.

* cited by examiner

METHOD FOR WELDING PARTS MADE OF THERMOPLASTIC MATERIAL

This application is a 35 U.S.C. § 371 US national stage entry of International Application number PCT/FR2019/051775, filed Jul. 16, 2019, and claims priority and is entitled to the following French applications: FR1856537A filed Jul. 16, 2018; FR1856537 filed Jul. 16, 2018; FR1905222 filed May 17, 2019; FR1905222A filed May 17, 2019; FR1905223A filed May 17, 2019 and FR1905223 filed May 17, 2019. The contents of the aforementioned applications are incorporated by reference herein.

TECHNICAL FIELD

The present invention concerns a welding method, in particular an induction welding method and an installation for implementing this method.

TECHNICAL BACKGROUND

Composite materials comprising reinforcing fibres e.g. carbon fibres and/or glass fibres dispersed in a thermoplastic polymer matrix have numerous possible uses and in particular for the manufacture of aircraft fuselages in the field of aeronautics.

The dispersion of fibres in a thermoplastic polymer matrix imparts particular properties to rigid composite parts, in particular in terms of crack resistance, fatigue strength, recyclability.

Parts in composite materials are typically composed of several plies (layers) that are superimposed and laminated together, the fibres in each ply having a main direction that most often differs from the main direction of the fibres of adjacent layers. These plies (or layers) layers are also called «semi-finished products», which can be obtained for example by impregnating continuous, generally unidirectional fibres with resin. There are different production methods whereby the resin can be melted, or dissolved in a solvent, or is in powder form, in a fluidized bed, or dispersed in an aqueous suspension. The impregnated fibres are optionally stripped of the solvent or water then heated before melting the retained resin and forming the semi-finished product. It is also possible to cause the thermoplastic resin to enter the reinforcing fibres by closely mixing (co-mixing) the reinforcing fibres with thermoplastic fibres that are melted to form the resin surrounding the reinforcing fibres. The semi-finished products can also be obtained by impregnating a fibrous fabric or assembly of stitch-bonded unidirectional fibres (Non-Crimp Fabrics—NCF) with a polymer powder which, once melted, will form the matrix of the composite. A semi-finished product is characterized by homogeneous distribution of resin (then called a matrix) around the reinforcing fibres.

For some applications, it may be necessary to associate several composite parts e.g. for an aircraft fuselage, skin panel, stiffeners and frames.

These composite parts can be assembled by welding, in particular by technology of induction type. This process uses an inductor emitting a magnetic field. This magnetic field causes a rise in temperature of induction-sensitive materials, up to a temperature suitable for welding thermoplastic polymers.

At the current time, the induction welding of composite parts involves either direct heating of the composite materials to be assembled, or heating an insert (or susceptor) reacting to the magnetic field and intrusive (generally in metal material) previously deposited at the interface to be assembled.

However, a method based on direct heating of the carbon fibres of the composite parts to be assembled has the following disadvantages:

implementation thereof requires that the carbon fibres be continuous and have orientations or intermingling which promote the creation of current loops in the material;

this method does not generally allow localisation of the heat at the interface alone; this often leads to heating the whole composite part which, if not corrected by suitable coolers, can translate as risks of decompaction possibly causing delamination of the layers of the composite part; the heat produced can also affect zones bordering the weld line;

since these zones are not subjected to compacting pressures, they may suffer the same negative effects as those cited above;

it is generally necessary to add an induction-sensitive material, such as a thermoplastic film containing fillers or conductive or ferro-electrical structures, at the weld interface; the addition of such films makes the certification of welded parts for aeronautic applications very difficult to obtain;

it is not possible to use the induction welding technique when the reinforcing fibres of the composite material are not conductive or ferromagnetic (e.g. glass fibres, aramid fibres . . . );

this method is sensitive to the type, configuration (i.e. lay-up) and thickness of the parts to be welded;

this method, applied to the welding of carbon composite parts, does not allow guaranteed welding parameters in the start and end zones of the weld and therefore the homogeneity of the weld joint using this dynamic technology.

To overcome these problems, different strategies have been put forward.

For example, document WO 2013/110270 describes an induction welding method wherein a cooling unit follows the inductor so that the surface of the composite part facing the inductor is cooled and does not melt.

Document EP 1849581 concerns an induction welding device to secure a moulded plastic part onto the surround of a tubular part composed of at least one metal layer and a layer of thermoplastic resin, the device comprising an element having extensive magnetic permeability to channel the magnetic field lines.

As indicated above, another solution frequently employed is to insert a susceptor composed of a material that is more induction-sensitive than carbon e.g. a metal mesh at the interface of the parts to be welded. By adapting the intensity of the emitted magnetic field, it is possible to localise heating at the susceptor and hence at the interface of the parts to be welded.

For example, document EP 2907651 describes an induction welding method whereby an assembly formed of two parts to be welded and a field absorber (or susceptor) positioned at the interface of the parts is subjected to a magnetic field by an inductor at a particular incidence.

Document EP 20150393 describes an induction welding method wherein two parts are placed in a mould for coupling therein, at least one contact surface between the parts comprising heat-activated coupling means and an induction-sensitive component.

Document WO 2012/158293 describes an induction welding method wherein a susceptor is placed between two composite parts and a magnetic field parallel to the susceptor is generated.

Document EP 0720906 describes a thermoplastic welding method wherein a susceptor is placed at the interface of the two resin parts to be welded.

Document U.S. Pat. No. 5,753,058 relates to thermoplastic welding apparatus for welding composite parts comprising a conductive susceptor at the interface to be welded.

Document U.S. Pat. No. 5,902,935 relates to a method for evaluating the integrity and strength of a thermoplastic weld in which a susceptor is incorporated.

Document U.S. Pat. No. 6,323,468 describes induction welding apparatus for assembling two components generating a magnetic field to cause heating of a susceptor placed between the two components to be welded.

Document WO 2008/087194 describes an induction method to weld a thermoplastic material to a composite material comprising a heat-setting matrix reinforced with fibres, wherein preferably a conductive material is positioned at the interface of the materials to be welded and is heated by induction.

Document U.S. Pat. No. 4,978,825 describes an induction method to weld an assembly comprising two parts between which a susceptor is placed which is heated by induction, the inductor being incorporated inside a pressure roller.

Document WO 2015/140270 concerns a thermoplastic welding method to weld two parts in thermoplastic composite material. Metal inserts are placed between the two surfaces of the parts to be welded so that induced, heat-producing currents are generated in these inserts, the assembly to be welded being enclosed in a sealed chamber in which a partial vacuum is applied.

However, the use of a susceptor may result in a non-homogeneous weld and has the disadvantage of inserting a non-desirable third body in the weld assembly. The presence of a third body at the interface of the parts which have been welded may in particular prevent or restrict the use of the welded parts in the field of aeronautics.

Document FR 2488828 concerns a method for welding sheets of thermoplastic material corresponding to flexible sheets which are likely to ripple and form creases. This method consists in particular of placing the two sheets to be welded so that their adjacent edges overlap, moving a hot wedge between the overlapping edges, providing a certain amount of thermoplastic material and pressing the overlapping edges allowing them to cool. Document FR 2488828 does not describe the welding of rigid parts.

There is therefore a real need for providing an efficient, rapid method having good performance for assembling parts in thermoplastic materials, in particular rigid parts in thermoplastic materials, and which avoids the above-mentioned disadvantages.

There is also a true need to provide an assembly method, using localised heating at the interface of parts in thermoplastic materials, that performs well, is efficient, rapid and dynamic.

There is a true a need to provide a method allowing the assembly of parts by heating. In particular, there is a true need to provide an efficient method allowing the assembly of parts by heating without filler material, without deformation, without delamination and without decompaction of the parts to be welded.

SUMMARY OF THE INVENTION

The invention first relates to a method for welding at least two parts, in particular two rigid parts, comprising a thermoplastic material and having respective surfaces to be welded comprising:
  inserting an insert between the surfaces to be welded of the two parts, said insert having a thickness of 5 mm or less;
  providing heat by said insert;
wherein the insert moves in relation to the parts to be welded throughout welding, in a welding direction.

In some embodiments, the heat is provided by said insert which is heated via induction, via resistive effect, via vibration, via friction, via ultrasound, via use of laser, via a stream of hot gas or via conduction from an external heat source.

In some embodiments, the insert comprises an induction-sensitive material, and the heat of the insert is provided through the generation of a magnetic field by at least one inductor.

In some embodiments, the insert and the inductor move together in relation to the parts to be welded throughout welding in the welding direction.

In some embodiments, the insert comprises an electrically conductive material, and the heat of the insert is provided via resistive effect.

In some embodiments, the method further comprises the contacting of the welding surfaces of the two parts to be welded by applying pressure onto at least one of the two parts upstream and/or downstream of the position of the insert in relation to the welding direction.

In some embodiments, the method further comprises a step to cool the free surfaces of the parts to be welded, in particular by applying a heat-regulating block onto at least one of the two parts behind the position of the insert in relation to the welding direction, and in front of the pressure-applying element(s) if any.

In some embodiments, the insert is in contact with each of the surfaces to be welded of the two parts.

In some embodiments, the insert is not contact with at least one of the surfaces to be welded of the two parts.

In some embodiments, the method further comprises the movement, together with movement of the insert, of a spacer element between the surfaces to be welded of the two parts, the spacer element being positioned ahead of the insert in the welding direction.

In some embodiments, at least one of the two parts, preferably both parts, are in composite material comprising reinforcing fibres in a matrix of the thermoplastic material.

In some embodiments, the reinforcing fibres are carbon fibres and/or glass fibres, or any other type of fibre able to reinforce or functionalize a polymer.

In some embodiments, at least one of the two parts, preferably both parts, essentially consist, or consist, of the thermoplastic material.

In some embodiments, the thermoplastic material is selected from the group of polyamides, polyimides in particular polyetherimides, polyaryletherketones in particular polyetherketoneketones and polyetheretherketones, ethylene polyterephtalates, polyolefins in particular polypropylene, phenylene polysulfides, polysulfones, chlorinated polymers in particular polyvinyl chloride (PVC) and polyvinylidene fluoride (PVDF), acrylic or methacrylic polymers, and it is preferably a polyaryletherketone such as polyetherketoneketone or polyetheretherketone.

In some embodiments, at least one of the two parts, preferably both parts, are a multilayer structure.

In some embodiments, the layer comprising the surface to be welded of at least one of the two parts, preferably of both parts:
- comprises a thermoplastic material having a melting point lower than that of the thermoplastic material of the other layers of the parts; and/or
- comprises a thermoplastic material having lesser viscosity than that of the thermoplastic material of the other layers of the parts; and/or
- comprises a volume amount of thermoplastic material greater than that of the other layers of the parts; and/or
- comprises a reinforcing material of strong cross density, preferably a woven carbon fabric; and/or
- comprises a unidirectional fibre layer oriented in the welding direction.

In some embodiments, the method does not comprise a step to add additional thermoplastic material, in particular at the interface of the surfaces to be welded.

In some embodiments of the induction welding method, the insert comprises an induction-sensitive metal material. The insert is optionally fully or partially coated with a functional coating for example affording anti-corrosion properties (anti-corrosion material) or facilitating the sliding of the insert between the two parts (material facilitating sliding of the insert between the two parts).

In some embodiments of the induction welding method, the insert consists of a ferromagnetic material having a Curie temperature Tc, which could facilitate control over the method.

In some embodiments, the method further comprises the formation of a bead (or meniscus) of thermoplastic material at the end of the weld interface.

In some embodiments, the parts are parts of an aircraft fuselage.

The invention further relates to an installation for welding at least two parts, in particular two rigid parts, comprising a thermoplastic material and having respective surfaces to be welded, comprising:
- a support to hold the two parts to be welded;
- an arm having at its end portion a heating insert configured to be inserted between the surfaces to be welded of the two parts;

the insert, of thickness 5 mm or less, being configured to move in relation to the parts to be welded throughout welding in a welding direction.

In some embodiments, the installation also comprises a device to generate the heat of said insert via induction, via resistive effect, via vibration, via friction, via ultrasound, via laser, via a stream of hot gas or via conduction from an external heat source.

In some embodiments of an induction welding installation, the heat-generating device is at least one inductor, and said insert comprises an induction-sensitive material.

In some embodiments, the insert and inductor are configured to move together in relation to the parts to be welded, throughout welding in the welding direction.

In some embodiments, the arm carrying the insert at its end portion is attached to the inductor.

In some embodiments of a welding installation via resistive effect, the heat-generating device is a device generating an electrical current.

In some embodiments, the installation further comprises one or more compacting rollers and/or one or more pressure rollers.

In some embodiments, the installation also comprises at least one heat-regulating block.

In some embodiments of the induction welding installation, the compacting rollers and/or pressure rollers are attached to the inductor.

In some embodiments, the compacting roller(s) are configured to be vibrated at an adapted frequency. This vibration is adapted to optimise the interpenetration phenomena required to obtain high-performance welding.

In some embodiments, the installation comprises a controlled-temperature chamber preferably comprising a flexible skirt.

In some embodiments, the insert is a plate of thickness 5 mm or less, preferably of 0.3 to 5 mm, more preferably 0.3 to 3 mm, further preferably 0.5 to 1.5 mm.

In some embodiments of the induction welding installation, the insert comprises an induction-sensitive metal material and is optionally fully or partially coated with a functional coating for example affording anti-corrosion properties (anti-corrosion material) or facilitating the gliding of the insert between the two parts (material facilitating gliding between the two parts).

In some embodiments of the welding installation via resistive effect, the insert comprises an electrically conductive material and is optionally fully or partially coated with an insulating material.

In some embodiments, the installation further comprises a second arm having at its end portion a spacer element optionally attached to the insert.

In some embodiments, the support is configured to be heated.

With the present invention, it is possible to overcome the disadvantages of the prior art. More particularly, it provides a method that performs well, is efficient and rapid for assembling parts in thermoplastic materials and in particular rigid parts in thermoplastic materials. In particular, the method of the invention does not require the permanent insertion of a third body in the welded assembly, whilst allowing localised heating preferably at the interface of the parts to be welded. Localised heating in the interface area to be welded allows limiting of thermal effects in the other plies of the composite part and thereby prevents any deterioration of the quality of the parts to be assembled through delamination and/or decompaction. In general, the quality of the elementary parts before assembly has been controlled and validated; it is therefore of high interest to have available a welding technology which does not jeopardize the quality of the parts as provided by the present invention.

This is achieved through the use of an insert providing heat and which is in movement in relation to the parts to be welded in the welding direction. The heat can be generated by any adapted means, in particular via induction, via resistive effect, via induction, vibration, via friction, via ultrasound, via use of laser, via a stream of hot gas or via conduction from an external heat source; in particular via induction or resistive effect. For example, the magnetic field created by the inductor produces effects which are concentrated in the insert, inducing localised heating at this insert. Similarly, the electrical current generates heat within the insert via resistive effect. The insert moves in relation to the parts to be welded in the welding direction and is therefore not integrated in the final assembly.

Additionally, the invention has one or preferably more of the following advantages:
- the method of the invention allows the welding of rigid parts;
- the method of the invention allows the welding of all types of thermoplastic materials, including materials not comprising conductive elements (such as carbon fibres or other fibres, or conductive fillers);

for induction welding, the method can allow the use of reduced induction power compared with methods based on heating the carbon contained in the composite parts to be welded;

the method can allow better control over welding temperature;

the method can allow the welding of large-size parts and/or of complex geometry such as double bends;

the method can allow some tolerance with regard to complementarity to be heeded by the surfaces to be welded;

for induction welding, the method can allow reduced consumption of energy and materials, since heating is localised at the surfaces to be welded by material that is more induction-sensitive than the materials of the parts to be welded;

associated for example with the choice of optimised material for one of the weld layers of the parts to be welded (i.e. one of the layers at the weld interface), the method of the invention can allow the formation of beads (or menisci) at the end of the weld interface thereby limiting effects related to damage or incipient cracks.

DETAILED DESCRIPTION

Figure 1:
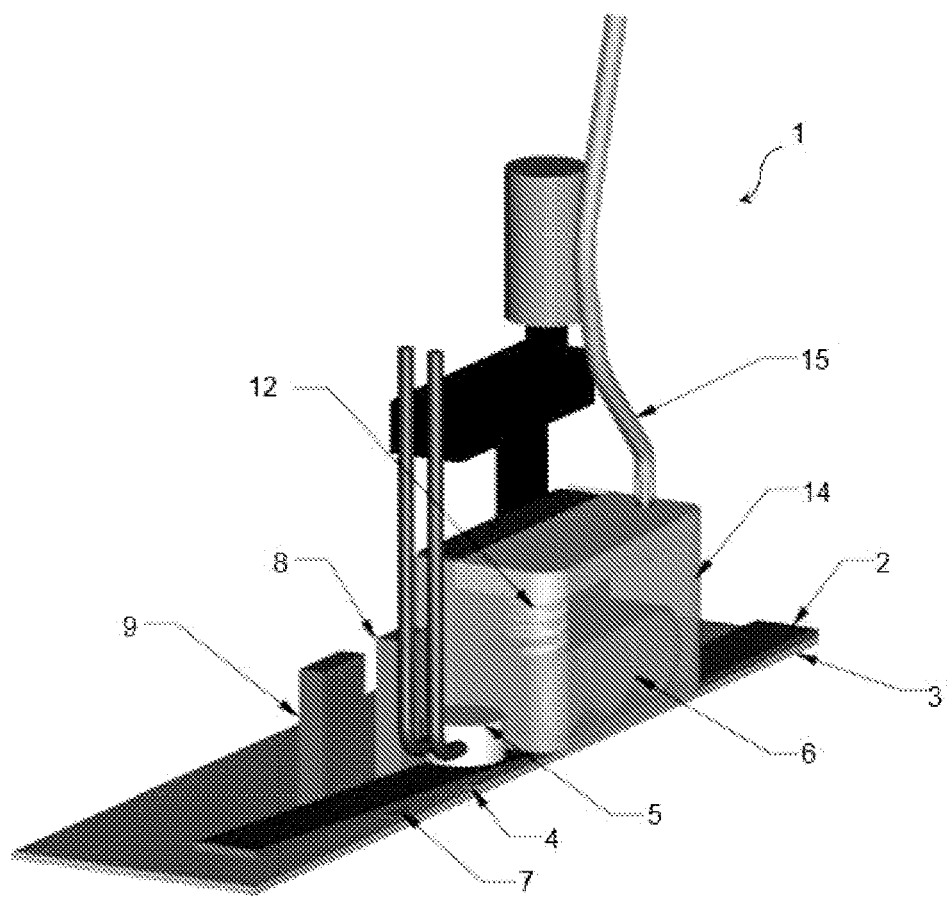
FIG. 1 gives a schematic perspective view of an induction welding installation according to the present invention.
Figure 2:
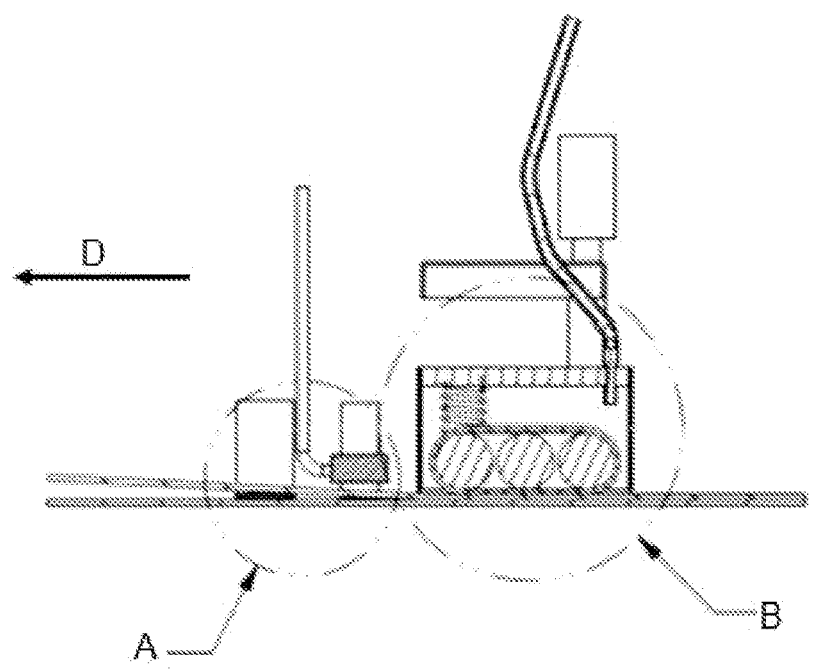
FIG. 2 gives a schematic cross-sectional view of an induction welding installation according to the present invention.
Figure 3:
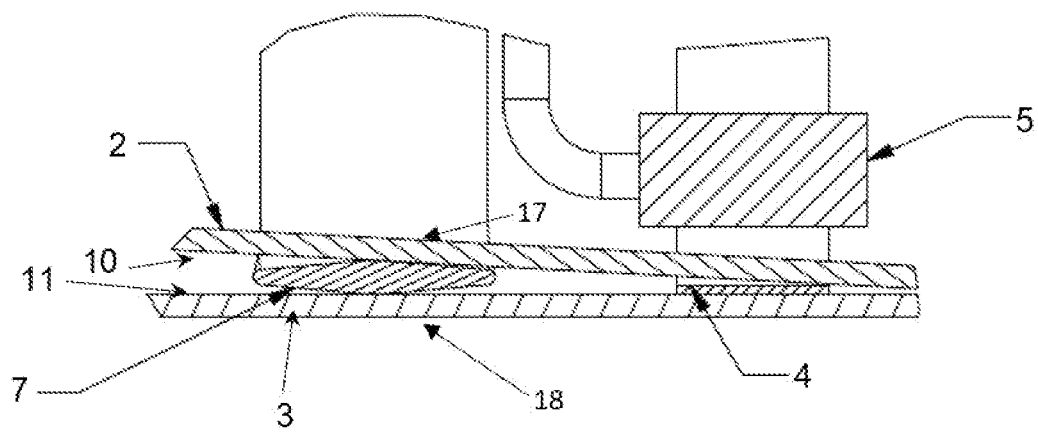
FIG. 3 gives an enlarged cross-sectional view of zone A in FIG. 2.
Figure 4:
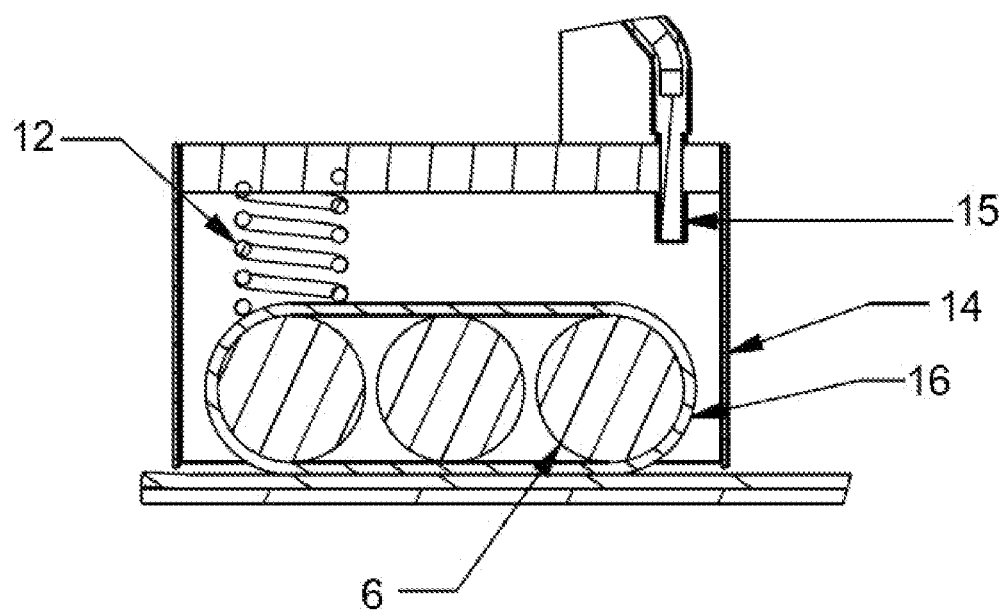
FIG. 4 gives an enlarged cross-sectional view of zone B in FIG. 2.

A more detailed, nonlimiting description of the invention is now given.

By «rigid part» it is meant a part which is not deformed or only scarcely deformed under its own weight. The rigidity of the part can be characterized by testing the deformation of a test specimen of the part to be welded. For this testing, a test specimen is prepared cut from a portion of the part to be tested and having the narrowest thickness (if of variable thickness), said test specimen having a length of 12 cm, and width of 1 cm. Rigidity is assessed by placing and centring the test specimen on two supports spaced 10 cm apart. Under standard conditions of temperature and pressure, the test specimen exhibits maximum deflection at its centre of 1 cm, corresponding to relative deformation in relation to length of no more than 10%.

By «part to be welded» it is meant a part comprising a thermoplastic material. The part can be a part of single block structure (monolayer part) or a part of multilayer structure (multilayer part).

By «composite material», it is meant a material comprising reinforcing fibres in a matrix of thermoplastic material. By «non-composite material», it is meant a material devoid of reinforcing fibres.

The expressions «composite material» «composite layer», «ply» and semi-finished product» are used interchangeably. The semi-finished products can be in the form of a web of fibres in a resin matrix. Preferably, the orientation of the reinforcing fibres is essentially unidirectional in semi-finished products. The semi-finished products can also be fibrous fabrics or mats of unidirectional reinforcing fibres also known as Non-Crimp Fabrics (NCF) impregnated with polymers. Semi-finished products can also be products comprising thermoplastic polymer not reinforced with continuous reinforcing fibres, whether or not formulated with various fillers.

By «compacted part» it is meant a part composed of at least two superimposed layers, laminated together and compacted By «deposited part» it is meant a part composed of at least two superimposed layers laminated together, without compaction by means of pressure-applying equipment of autoclave or press type.

By «welded product» it is meant a product comprising at least two parts such as defined above, welded together according to the method of the present invention.

Unless otherwise stated, all percentages concerning indicated quantities are volume percentages.

The invention is not limited to induction welding, but also relates to welding methods comprising the insertion of a heat-providing insert. The heat can be generated via induction, via resistive effect, via vibration, via friction, via ultrasound, via use of laser, via a stream of hot gas or via conduction from an external heat source; preferably via induction or via resistive effect; more preferably via induction or alternatively via resistive effect.

With reference to FIGS. 1 to 4, the installation 1 is intended for the implementation of an induction method for welding two rigid parts 2, 3 each comprising a thermoplastic material and having respective surfaces to be welded 10, 11 and respective free surfaces 17, 18. However, the invention is not limited to the welding of two parts and could be applied to the welding of more than two parts, for example the welding of one part with a first other part and a second other part e.g. juxtaposed.

In particular, the parts 2,3 can be rigid in that they are not deformed or are only scarcely deformed under their own weight. Their rigidity can be characterized by testing the deformation of a test specimen of the part to be welded. For this deformation test, a test specimen is prepared cut from a portion of the specimen to be tested and having the narrowest thickness (if of variable thickness), said specimen having a length of 12 cm and width of 1 cm. Rigidity is assessed by placing and centring the test specimen on two supports spaced 10 cm apart. Under standard conditions of temperature and pressure, the test specimen shows maximum deflection at its centre of no more than 1 cm, corresponding to relative deformation in relation to length of no more than 10%.

More particularly, the parts 2,3 are just as rigid under the heat conditions of the welding operation i.e. they are rigid before, during and after welding.

The parts 2, 3, in relation to each other, may comprise compatible different thermoplastic materials, or else one same thermoplastic material. By «compatible thermoplastic materials» it is meant miscible thermoplastic materials i.e. polymers the mixture of which has a glass transition temperature intermediate between those of the polymers. Examples of suitable thermoplastic materials for the invention are polyamides, polysulfones, phenylene polysulfide (PPS), polyimides in particular polyetherimides (PEI), polyaryletherketones (PAEK) in particular polyetherketoneketones (PEKK) and polyetheretherketones (PEEK), polyethylene terephthalate, polyolefins such as polypropylene, chlorinated polymers such as polyvinyl chloride (PVC) and polyvinylidene fluoride (PVDF), acrylic or methacrylic polymers. The thermoplastic material can be an amorphous, crystalline or semi-crystalline thermoplastic material.

The polyamides can particularly be a polyphthalamide (PPA), PA 11, PA 12, PA 6, PA 1010, PA 66, PA 46 or a copolyamide.

It may also be a combination of several of the above materials.

Advantageously, the parts 2, 3 comprise PPS, PEI or a PAEK such as PEEK or PEKK as thermoplastic material.

The parts 2, 3 may comprise fillers (including reinforcing fibres) and/or functional additives. Among functional additives, particular mention can be made of one or more surfactants, UV stabilizers, heat stabilizers, biocidal agents, impact modifiers and/or expanding agents.

The fillers may comprise fibres or non-fibrous fillers. Non-fibrous fillers are mineral fillers in particular such as alumina, silica, calcium carbonate, titanium dioxide, glass beads, carbon black, graphite, graphene and carbon nanotubes.

Fibrous fillers can be so-called chopped fibres or continuous reinforcing fibres.

In particular, the parts 2, 3 can independently be in composite material, said composite material comprising reinforcing fibres in a matrix of the thermoplastic material. Reinforcing fibres particularly allow rigidification of the parts.

The reinforcing fibres can particularly be glass fibres, quartz fibres, carbon fibres, graphite fibres, basalt fibres, silica fibres, metal fibres such as steel fibres, aluminium fibres or boron fibres, ceramic fibres such as silicon carbide or boron carbide fibres, natural plant fibres, synthetic organic fibres such as aramid fibres or fibres of poly(p-phenylene benzobisoxazole) better known as PBO, or PARK fibres, or mixtures of such fibres. Preferably, they are carbon fibres or glass fibres, and more particularly carbon fibres.

Examples of composite materials are: carbon fibres in a PEKK matrix, glass fibres in a PEKK matrix, carbon fibres in a polyamide matrix e.g. PA11, PA12, PA6 or PA1010, glass fibres in a polyamide matrix e.g. PA11, P12, PA6 or PA1010, carbon fibres in a polypropylene matrix, glass fibres in a polypropylene matrix, carbon fibres in a polyethylene terephthalate matrix, glass fibres in a polyethylene terephthalate matrix, carbon fibres in a PEEK matrix, glass fibres in a PEEK matrix, carbon fibres in a PEI matrix, glass fibres in a PEI matrix, carbon fibres in a PPS matrix, glass fibres in a PPS matrix.

The parts 2, 3 can independently comprise from 25 to 80 volume %, preferably 45 to 70 volume % of reinforcing fibres e.g. carbon fibres and/or glass fibres relative to the total volume of the part. In particular, the parts 2, 3 can independently comprise reinforcing fibres in an amount of 25 to 30 volume %, or 30 to 35 volume %, or 35 to 40 volume %, or 40 to 45 volume %, or 45 to 50 volume %, or 50 to 55 volume %, or 55 to 60 volume %, or 60 to 65 volume %, or 65 to 70 volume %, or 70 to 75 volume %, or 75 to 80 volume % relative to the total volume of the part. The dispersion of reinforcing fibres in sufficient volume percentage allows rigidifying of the parts to be welded, or of the constituent layers thereof.

The parts 2, 3 may comprise an amount of matrix in thermoplastic material ranging from 20 to 75 volume %, preferably 30 to 55 volume % relative to the total volume of the part. In some embodiments, the parts 2, 3 comprise an amount of matrix in thermoplastic material of 20 to 25 volume %, or 25 to 30 volume %, or 30 to 35 volume %, or 35 to 40 volume %, or 40 to 45 volume %, or 45 to 50 volume %, or 50 to 55 volume %, or 55 to 60 volume %, or 60 to 65 volume %, or 65 to 70 volume %, or 70 to 75 volume %, relative to the total volume of the part.

In some embodiments, the parts 2, 3 can independently be essentially composed, or composed, of the thermoplastic material. The parts 2, 3 can independently be composed of a material devoid of any reinforcing element e.g. reinforcing fibres (in particular carbon fibres and glass fibres).

By «essentially composed of the thermoplastic material», it is meant that the part contains solely the thermoplastic material and optionally one or more functional additives; in particular, the part may comprise at least 90 volume % of the thermoplastic material, preferably at least 95%, or at least 98%, or at least 99%, e.g. approximately 100%.

The parts 2, 3 may independently be free of any electrically conductive material.

The parts 2, 3 may also independently comprise from 0 to 30 volume % of fillers and/or functional additives such as described above.

The parts 2, 3 may independently be single block structures or alternatively multilayer structures.

When at least one of the parts 2, 3 is a multilayer structure, the layers can be the same or differ from each other.

The above-mentioned characteristics in connection with the parts also apply to the layers individually.

Preferably, the part 2, 3 comprises (or consists of) several composite layers (or «semi-finished products») such as described above. The part 2, 3 can be a compacted part or a deposited part.

The number of composite layers in the part 2, 3 can therefore vary from 2 to 150, preferably from 4 to 40, more preferably from 6 to 30, ideally from 7 to 25.

Aside from the parts 2,3, no other thermoplastic material is added during the welding method. In particular, no other thermoplastic material is added at the interface of the surfaces to be welded 10,11, whether upstream or downstream of the insert 4. The weld joining between the two welded parts 2,3 is therefore formed by the matrices of thermoplastic material of the parts themselves, in particular via interpenetration.

The weld product displays satisfactory mechanical performance on assembly. This mechanical performance on assembly can be evaluated for example by measuring ultimate shear stress. Ultimate shear stress is mechanical stress applied to parallel to the surface of the weld product causing destruction of the material at the weld interface. For example, in one known technique in accordance with standards prEN 6060 or ISO4587, grooves perpendicular to the welding direction can be made on each of the two surfaces of the weld product, thereby localising shear force thus generated at the weld interface. Shear strength corresponds to the force required to rupture the weld product divided by the area resisting shear.

Preferably, the orientation of the reinforcing fibres is essentially unidirectional in each composite layer. More preferably, the unidirectional orientation of the reinforcing fibres differs from one layer to another. Further preferably, two adjacent layers have unidirectional orientations of the reinforcing fibres which essentially have an angle of about 90° to each other; or which essentially have an angle of about 45° to each other. Alternatively, the reinforcing fibres in at least one of the composite layers, and in particular in each of the composite layers, can have several directions.

The thermoplastic material can be the same as or differ from one layer to another of a multilayer part 2, 3. Preferably, the thermoplastic material is of same type (e.g. PEKK or PEEK or PPS) in all the layers of the part 2, 3. It may optionally comprise a different grade from one layer to another, for example different viscosity, different molecular weight or different melting point. Alternatively, the grade of the thermoplastic material is the same in all the layers.

In some embodiments, when at least one of the parts 2, 3 is a multilayer structure, the layer comprising the surface to be welded 10, 11 (in the present description also called «first layer») comprises a thermoplastic material having a lower melting point than the melting point of the thermoplastic material(s) of the other layers of the part 2, 3. The melting point of the thermoplastic material of the first layer can be 10 to 100° C. lower, preferably de 20 to 60° C. lower, more preferably 35 to 50° C. lower than the melting point of the thermoplastic material(s) of the other layers of the part 2, 3.

The layer comprising the surface to be welded 10, 11 may also comprise a thermoplastic material having lesser viscosity than that of the thermoplastic material(s) of the other layers of the part 2, 3.

As an example, for thermoplastic materials selected from among polyetherketoneketones (PEKK), the viscosity of the thermoplastic material of the first layer can be 3 to 30 $cm^3$/10 mn lower, preferably 5 to 20 $cm^3$/10 mn lower, more preferably 7 to 15 $cm^3$/10 mn lower than the viscosity of the thermoplastic material(s) of the other layers of the part 2, 3. The indicated viscosities are Melt Volume Index values (MVI) or Melt Volume Rate values (MVR) measured according to standards ISO/FDIS/1133_1 and ISO/FDIS/1133_2. Measurement is performed at 380° C. under a weight of 1 kg. The products are dried before MVI measurement.

The layer comprising the surface to be welded 10, 11 may also comprise a larger volume of thermoplastic material than the other layers of the part 2, 3 or a smaller volume of reinforcing fibres than the other layers of the part 2, 3. The volume of thermoplastic material in the first layer can vary from 30 to 100%, preferably 45 to 80%, more preferably 55 to 70%, relative to the total volume of said layer of the part 2, 3. The layer comprising the surface to be welded, enriched with resin compared with the other layers of the part 2,3, is preferably oriented at 0° to the welding direction.

For example, the parts 2, 3 in their outer portions may have strong fibre reinforcement whilst maintaining at the surfaces to be welded the amount of thermoplastic material required for good welding.

The presence of a layer comprising the surface to be welded 10, 11 having lesser viscosity and/or a greater volume amount of thermoplastic material provides for facilitated welding and/or better performance thereof and in particular can allow the forming of a bead (or meniscus) of thermoplastic plastic at the weld interface.

The layer comprising the surface to be welded 10, 11 may also comprise a reinforcing material having strong cross density such as a woven carbon fabric.

The layer comprising the surface to be welded 10, 11 as thermoplastic material, may also comprise a mixture of two or more thermoplastic species (e.g. a mixture of a polyetherimide and a PAEK), the other layers of the part 2, 3 as thermoplastic material only comprising a single thermoplastic species.

The parts 2, 3 may independently be of constant thickness or of varying thickness, for example varying in the welding direction D.

One advantage of the induction welding method of the invention is that it is relatively little sensitive to the distance between the inductor and the surfaces to be welded 10, 11 of the parts 2, 3.

The installation 1 comprises a support to hold the parts 2, 3 to be welded (not shown in FIG. 1). The support may also hold the parts 2, 3 during welding operations, for example by clamping. This support preferably comprises a planar surface intended to hold the parts 2, 3 but it may also be of any possible shape.

Advantageously, particularly in the case of heat-conducting materials such as a carbon reinforced composite, it can be useful to preheat the area to be welded to a temperature which must always remain lower than the melting point of all the constituent materials of the structure to be welded, using any suitable means. It is also possible to heat the support. For example, and in particular for PAEK, the temperature can be 40 to 150° C. lower, preferably 50 to 120° C. lower, more preferably 70 to 90° C. lower than the melting point. Pre-heating allows limiting of the temperature difference between the welded interface and the remainder of the parts 2,3, thereby limiting the flow of heat from the interface towards the parts 2,3. Heating also provides better control over crystallization of the materials, in particular in the weld area. Heating can be local, in the vicinity of, or perpendicular to the areas to be welded.

Advantageously, particularly in the case of heat-conducting materials such as a carbon reinforced composite, it may also be useful to maintain heating of the welded area at a temperature which must remain lower than the melting point of all the constituent materials of the structures to be welded, using any suitable means e.g. infrared lamps or stream of hot air. Maintained heating also allows better control over the temperature of the interface to be welded. Heating also provides better control over crystallization of the materials in particular in the welded area. Heating can be local, in the vicinity of, or perpendicular to the welded area.

The installation 1 comprises an insert 4. The insert 4 is a heating insert in that it is able to provide heat. The heat can be provided by any suitable means in particular via induction, via resistive effect, via vibration, via friction, via ultrasound, via use of laser, via a stream of hot gas or via conduction from an external heat source.

For induction welding, the insert comprises a material comprising an induction-sensitive material, and the heat of the insert is generated through the generation of a magnetic field by at least one inductor 5.

By «induction-sensitive material», it is meant a material capable of being heated when subjected to a magnetic field, at least under certain conditions. In particular it may be a susceptor material or magnetic field absorber. Preferably, the insert 4 comprises a material that is more induction-sensitive than the constituent materials of the parts 2, 3 (carbon fibres in particular when applicable).

Preferably, the induction-sensitive material is a metal induction-sensitive material. The metal material can be selected for example from the group formed by iron, steel (e.g. stainless steel), aluminium, nickel-chromium, titanium, or a combination thereof.

The insert 4, as induction-sensitive material, may comprise or may consist of a ferromagnetic material having a Curie temperature Tc. This allows better control over the temperature to which the insert 4 is heated when implementing the welding method. If the temperature of the ferromagnetic material is lower than Tc, this material will have ferromagnetic behaviour and will be sensitive to induction. When the temperature of the material reaches Curie temperature Tc, the material will become paramagnetic and the induction sensitivity thereof will be modified; the temperature of said material can be maintained at temperature Tc.

The insert 4, particularly if it comprises a ferromagnetic material as induction-sensitive material, can be fully or partially coated with a functional coating providing anti-corrosion properties for example (anti-corrosion material) or facilitating the gliding of the insert between the two parts (material facilitating gliding of the insert 4 between the parts 2, 3).

For welding using resistive effect, the insert 4 comprises an electrically conductive material, and the heat of the insert is generated via resistive effect (or Joule effect). The resistive effect is generated by applying an electrical current. The insert can optionally be fully or partially coated with an insulating material.

Figure 16:
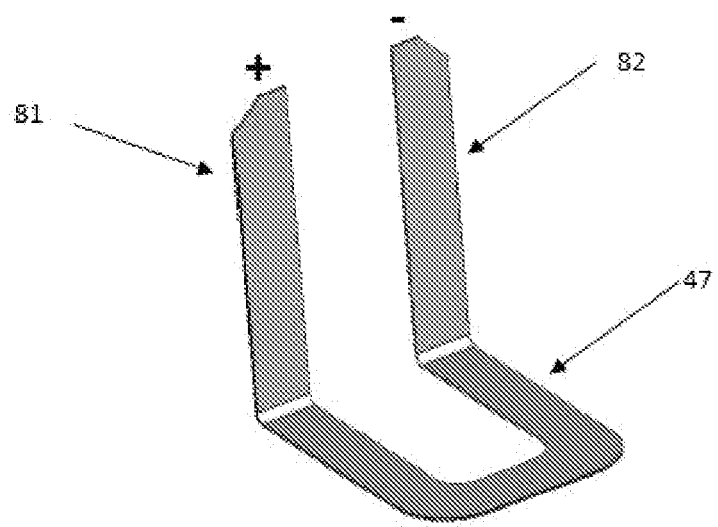
FIG. 16 gives a schematic perspective view of a «U-shaped» insert according to one embodiment of the welding method of the invention via resistive effect.
Figure 17:
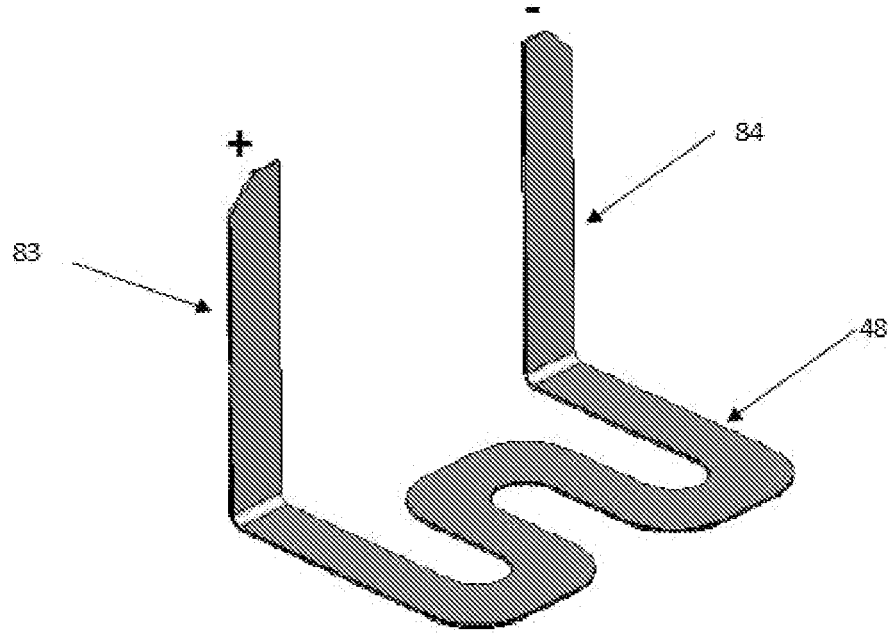
FIG. 17 gives a schematic perspective view of an insert according to one embodiment of the welding method of the invention via resistive effect.

The shape of the insert 4 can be adapted to heating via resistive effect. A «U-shaped» insert 47 positioned at the end portion of two arms 81 and 82 is illustrated in FIG. 16. An insert 48 positioned at the end portion of two arms 83 and 84 is illustrated in FIG. 17.

Preferably, the resistive conducting material can be selected from among nickel alloys, lead alloys, titanium alloys, manganese alloys, nickel-chromium alloys, iron-chromium-aluminium alloys and nickel-copper alloys.

Figure 18:
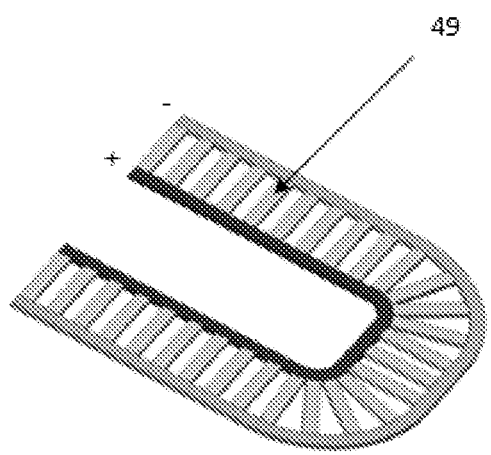
FIG. 18 gives a schematic perspective view of an insert according to one embodiment of the welding method of the invention via resistive effect.

The insert 4 may comprise different zones comprising different materials, to localise the heating zone at the surfaces to be welded. These materials can be assembled via brazing for example. Similarly, as illustrated in FIG. 18, the insert may comprise a series of resistive zones 49 for example, mounted in parallel to homogenise temperature along the insert.

For welding using laser, the insert 4 can be heated directly by at least one laser. Alternatively, the insert 4 may comprise a network of optical fibres allowing the energy of laser heating to be directed towards the surfaces to be welded.

For welding using a stream of hot gas, the insert 4 can be heated directly by the stream of hot gas e.g. via contacting. Alternatively, the insert 4 may comprise at least one duct allowing circulation of the stream of hot gas inside the insert.

For welding using conduction, the insert 4 can be heated by any suitable external heat source.

Figure 11:
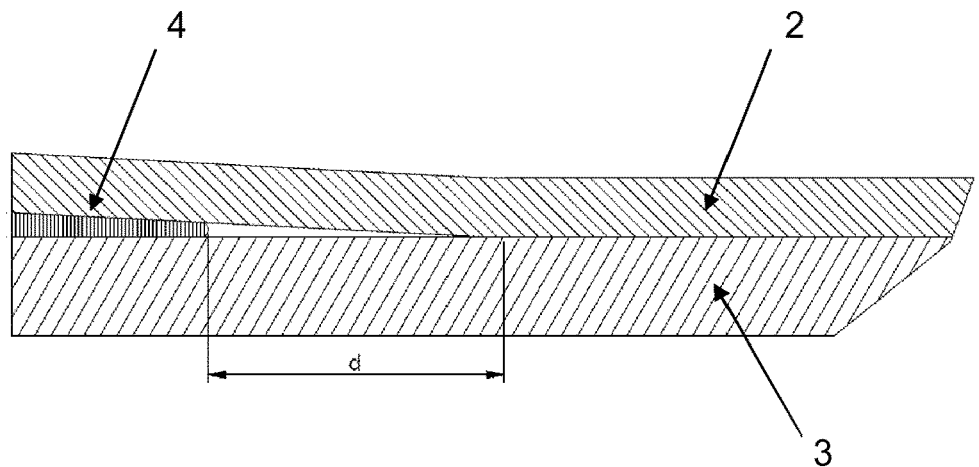
FIG. 11 gives a cross-sectional view of an insert and weld plates according to one embodiment of the method of the invention.

The insert 4 is advantageously a plate. The insert 4 has a thickness of 5 mm or less, preferable of 0.3 to 5 mm, more preferably of 0.3 to 3 mm, further preferably of 0.5 to 1.5 mm, still further preferably of 0.5 to 1 mm. In some embodiments, the insert 4 has a thickness of 0.1 or less, or of 0.1 to 0.2 mm, or of 0.2 to 0.3 mm, or of 0.3 to 0.5 mm, or of 0.5 to 1 mm, or of 1 to 1.5 mm, or of 1.5 to 2 mm, or of 2 to 2.5 mm, or of 2.5 to 3 mm, or of 3 to 3.5 mm, or of 3.5 to 4 mm, or of 4 to 4.5 mm, or of 4.5 to 5 mm. By «thickness» it is meant the dimension between the surfaces of the insert 4 in contact with the surfaces to be welded. If the surfaces of the insert 4 are not planar and parallel to each other, the thickness corresponds to the maximum dimension between these two surfaces. Such thicknesses ensure the rigidity of the insert, good heat transfer and scarce mechanical deformation of the rigid parts 2, 3 at the time of inserting the insert 4 and makes welding of rigid parts possible. For effective welding between the two parts to be welded, the temperature of the surfaces to be welded forming the weld interface must be higher than the melting point of the thermoplastic polymer when pressure is applied to the area to be welded by the compacting roller(s) 6. As illustrated in FIG. 11, it is preferable to limit the distance «d» between the end of the insert 4 and the contact point of the surfaces to be welded of parts 2, 3. This implies limiting the thickness of the insert 4 to prevent stressing the parts 2,3 to be welded, or one thereof, beyond their elastic limit. Therefore, the thickness of the insert 4 must be miniaturised, adapted and optimised accordingly, taking into account the rigidity of the parts to be welded 2, 3, and must typically have a thickness of 5 mm or less.

The insert 4 may have dimensions (e.g. length, width, thickness), shape and/or properties (e.g. spring effect) adapted to the parts to be welded and to the welding method (e.g. speed rate).

The insert 4 can have a width (perpendicular to the welding direction) at least equal to the width of the overlap area of the parts to be welded 2, 3.

Alternatively, the insert 4 can have a width smaller than the width of the of the overlap area of the parts to be welded 2, 3, thereby forming a weld solely on part of the width of the overlap area. The insert 4 can be of planar shape i.e. each of its two surfaces are planar. The planar surfaces can be parallel to each other (zero angle). To optimise heating of the surfaces to be welded in contact with the insert 4, the surfaces of the insert 4 can form a nonzero angle of bevel shape e.g. an insert having a planar bevel or an insert having a nonplanar bevel. The surfaces of the insert can have specific geometries adapted to the profile of the parts 2, 3 to be welded. The insert can be of optimised shape to promote heat transfer via contact with the substrates as illustrated in FIG. 11. For example, the geometry of the susceptor can be designed so that it is able to adapt to variable distances between substrates.

Figure 6:
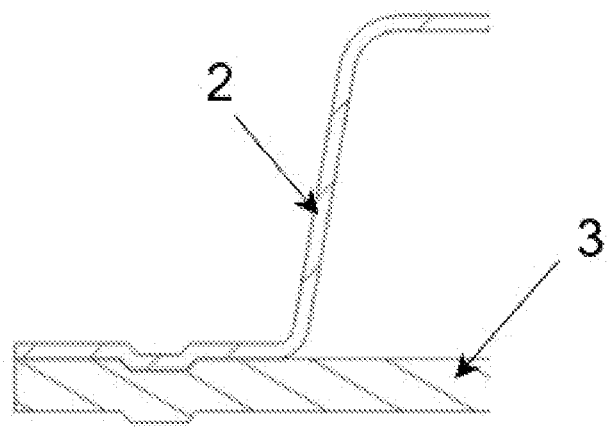
FIG. 6 gives a schematic view of two parts welded according to one embodiment of the method of the invention.

In other embodiments, the insert 4 can have any other adapted shape, in particular a nonplanar shape. The use of such insert of particular geometry allows the welding of parts having non-planar surfaces to be welded 10, 11. One example is illustrated in FIG. 6. The insert 4 is positioned at the end portion of an arm 8, and is preferably attached to the arm 8.

Figure 7:
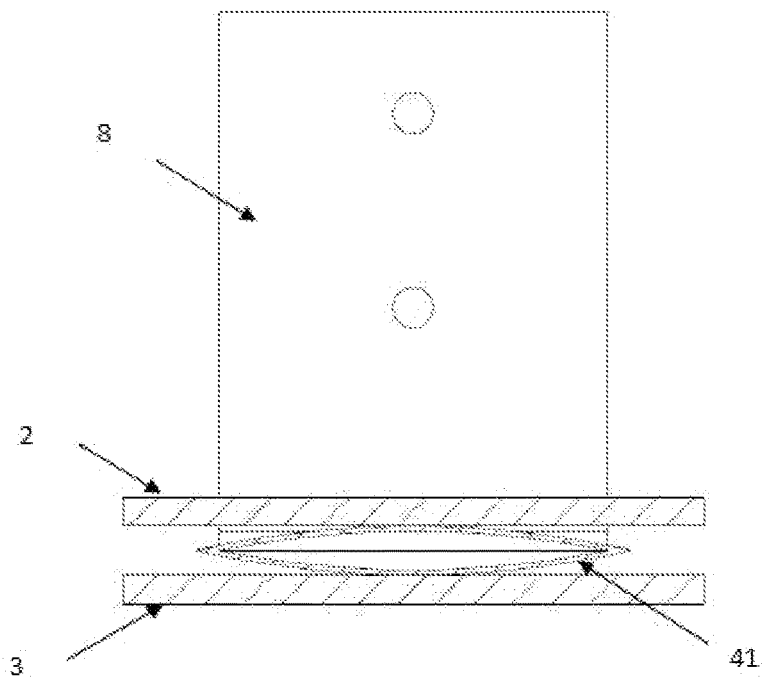
FIG. 7 gives a cross-sectional view of a «spring effect» insert in a first compression state according to one embodiment of the method of the invention.
Figure 8:
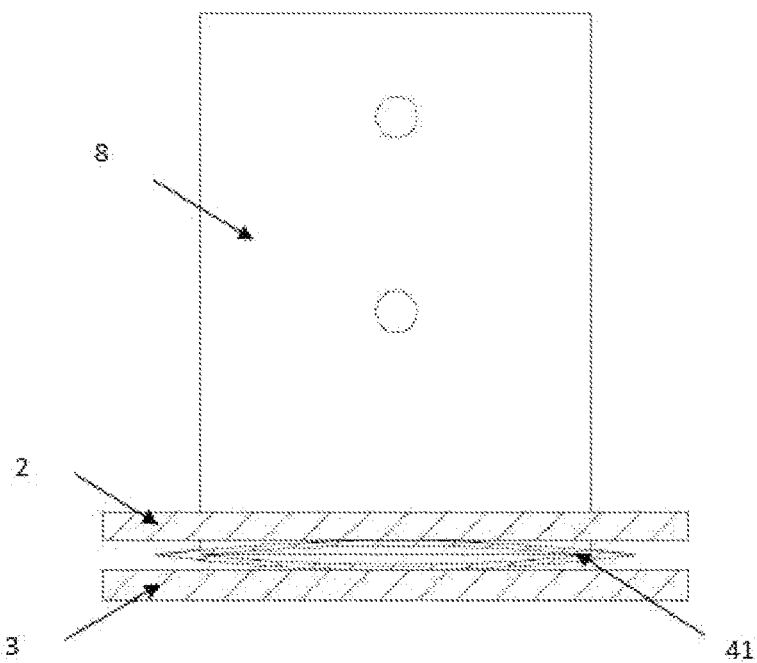
FIG. 8 gives a cross-sectional view of the «spring effect» insert in FIG. 7 in a second compression state according to one embodiment of the method of the invention.
Figure 9:
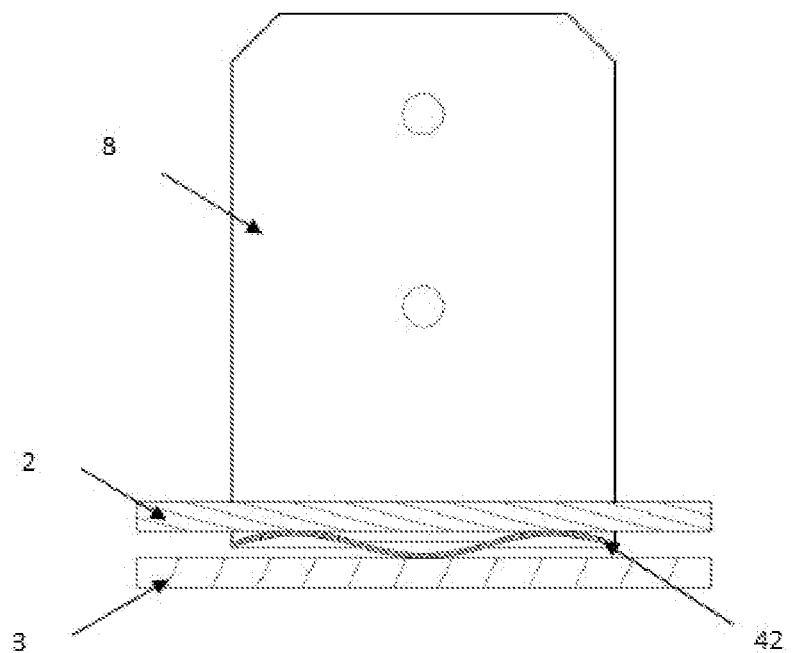
FIG. 9 gives a cross-sectional view of a «spring effect» insert in a first compression state according to one embodiment of the method of the invention.
Figure 10:
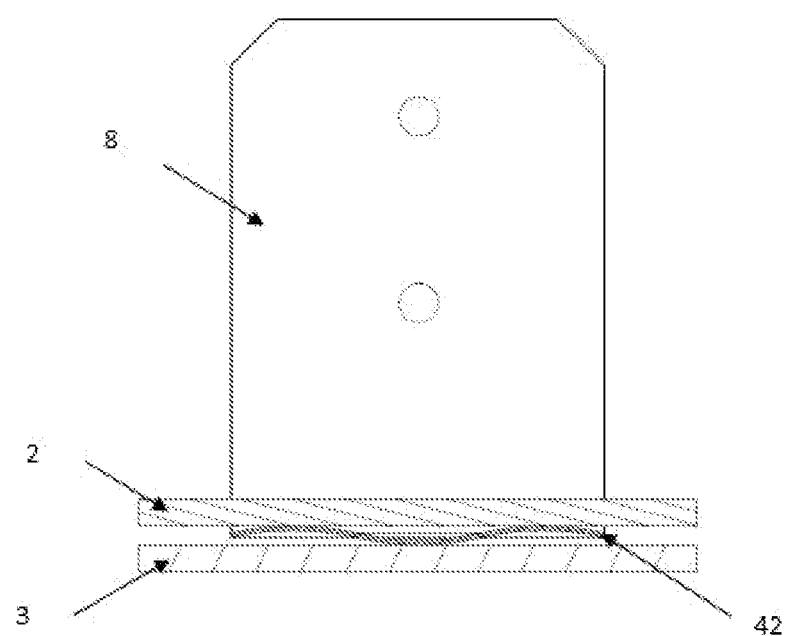
FIG. 10 gives a cross-sectional view of the «spring effect» insert in FIG. 9 in a second compression state according to one embodiment of the method of the invention.

An insert 41 «with spring effect» is illustrated in FIGS. 7 and 8 in two different states of compression. Another insert 42 «with spring effect» is illustrated in FIGS. 9 and 10 in two different states of compression. It may happen that the surfaces to be welded have variable spacing before welding on account of the manufacturing tolerances of the parts 2,3.

The induction welding method of the invention comprises insertion of the insert 4 between the surfaces to be welded 10, 11 of the two parts 2, 3. At the time of welding, the insert 4 moves in relation to the parts to be welded 2, 3, in the welding direction D.

This relative movement can be obtained by moving the parts to be welded 2, 3, the insert 4 remaining fixed in relation to the support. Alternatively, and preferably, it can be obtained by moving the insert 4 in relation to the support, the parts to be welded 2, 3 remaining fixed in relation to the support.

For example, the insert 4 can move in relation to the parts to be welded 2, 3, in the welding direction D, at a rate of 50 to 1000 mm/min, preferably 100 to 500 mm/min.

At the time of relative movement of the insert 4 in relation to the parts to be welded 2, 3, in the welding direction D, the travel path of the insert (and of the parts to be welded) can be rectilinear. Alternatively, in particular when the width of the insert is smaller than the width of the overlap area of the parts to be welded 2, 3, the travel path of the insert may not be rectilinear. For example, the insert may also move transversally, sinusoidally or incrementally, or otherwise.

For induction welding, the installation 1 also comprises at least one inductor 5. When implementing the induction welding method of the invention, the inductor 5 generates a magnetic field. The inductor has optimised geometry in relation the magnetic field to be applied: it may or may not be composed of windings. If the geometry thereof comprises windings, it can be an inductor having a single winding or several windings, these windings possibly being off-centred and/or oriented as a function of the materials to be welded.

Figure 13:
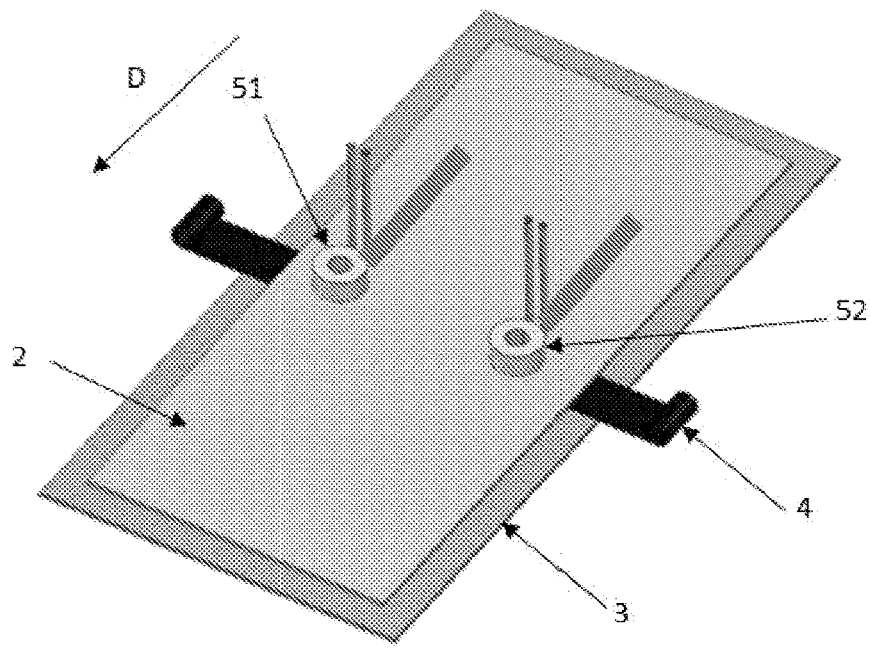
FIG. 13 gives a schematic perspective view of rectilinear relative movement of two inductors in relation to the welding direction.
Figure 15:
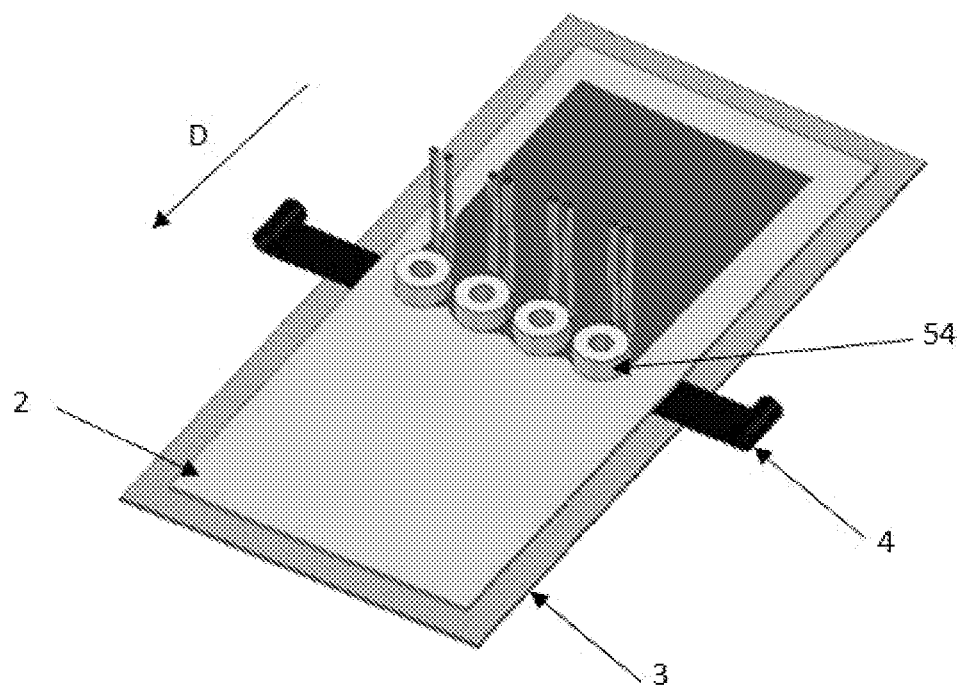
FIG. 15 gives a schematic perspective view of rectilinear relative movement of four inductors in relation to the welding direction, allowing surface welding.

In one embodiment, as illustrated in FIGS. 1, 2, 3, 13 and 15, the installation may comprise a single inductor 5, 53. In another embodiment, as illustrated in FIG. 13, the installation may comprise at least two inductors 51 and 52, forming separate welding areas. In another embodiment, as illustrated in FIG. 15, the installation may comprise a series of at least two inductors e.g. a series of four inductors 54, allowing surface welding of the two parts to be welded 2,3.

Figure 14:
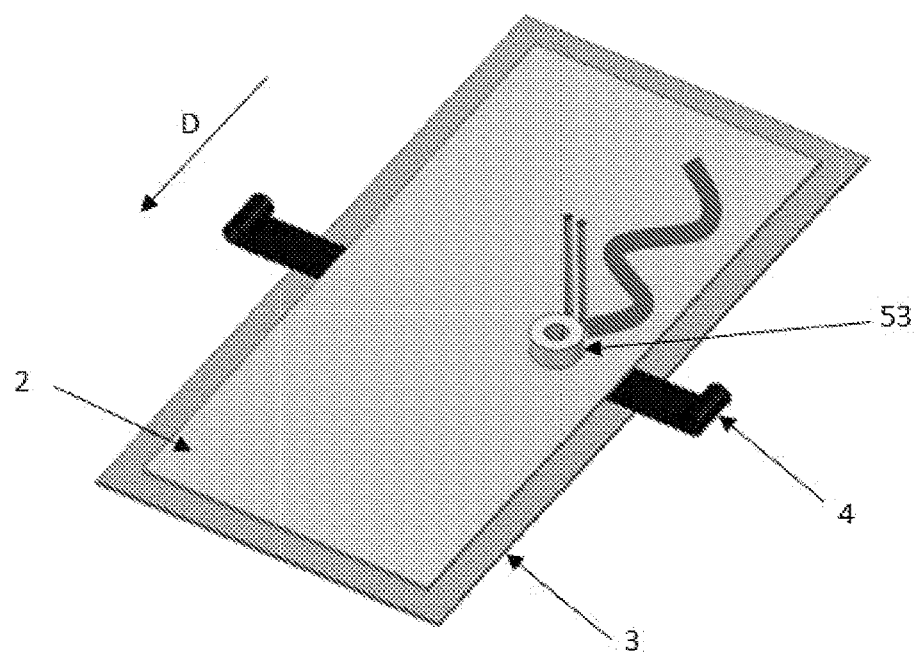
FIG. 14 gives a schematic perspective view of sinusoidal relative movement of an inductor in relation to the welding direction.

The inductor 5 can be fixed in relation to the parts 2, 3. The inductor 5 may therefore be of large size to allow heating of the insert 4 as it moves; provision can also be made for a plurality of fixed inductors 5 along the welding direction D. But preferably the inductor is mobile in relation to the parts 2, 3. During the relative movement of the insert 4 in relation to the parts to be welded 2,3, in the welding direction D, the travel path of the inductor can be rectilinear or it may be non-rectilinear. As illustrated in FIG. 13, the inductors 51 and 52 may have a rectilinear travel path. As illustrated in FIG. 15, the series of inductors 54 may also have a rectilinear travel path. As illustrated in FIG. 14, the inductor 53 may have a sinusoidal travel path.

Advantageously, when implementing the welding method of the invention, the insert 4 and the inductor 5 move together in relation to the parts to be welded 2, 3 at the time of welding in the welding direction D.

By the expression «move together», it is meant that they move at the same time in the same direction (here the welding direction D) and at the same speed.

Preferably, the arm 8 having the insert 4 at its end portion is attached to the inductor 5.

The welding method of the invention may comprise a step to contact the surfaces to be welded 10, 11 of the two parts to be welded 2, 3 by applying pressure onto at least one of the two parts 2, 3 upstream of (i.e. in front of) and/or downstream of (i.e. behind) the position of insert 4 in relation to the welding direction D.

Therefore, the installation 1 may also comprise one or more pressure-applying elements. These pressure-applying elements can be positioned behind and/or in front of the insert in relation to the welding direction D. The pressure-applying elements allow the application of pressure on the parts 2, 3 so that they are pressed one against the other. Preferably, when the installation 1 comprises several pressure-applying elements, the pressures applied by each of these pressure-applying elements are independent of each other.

Figure 12:
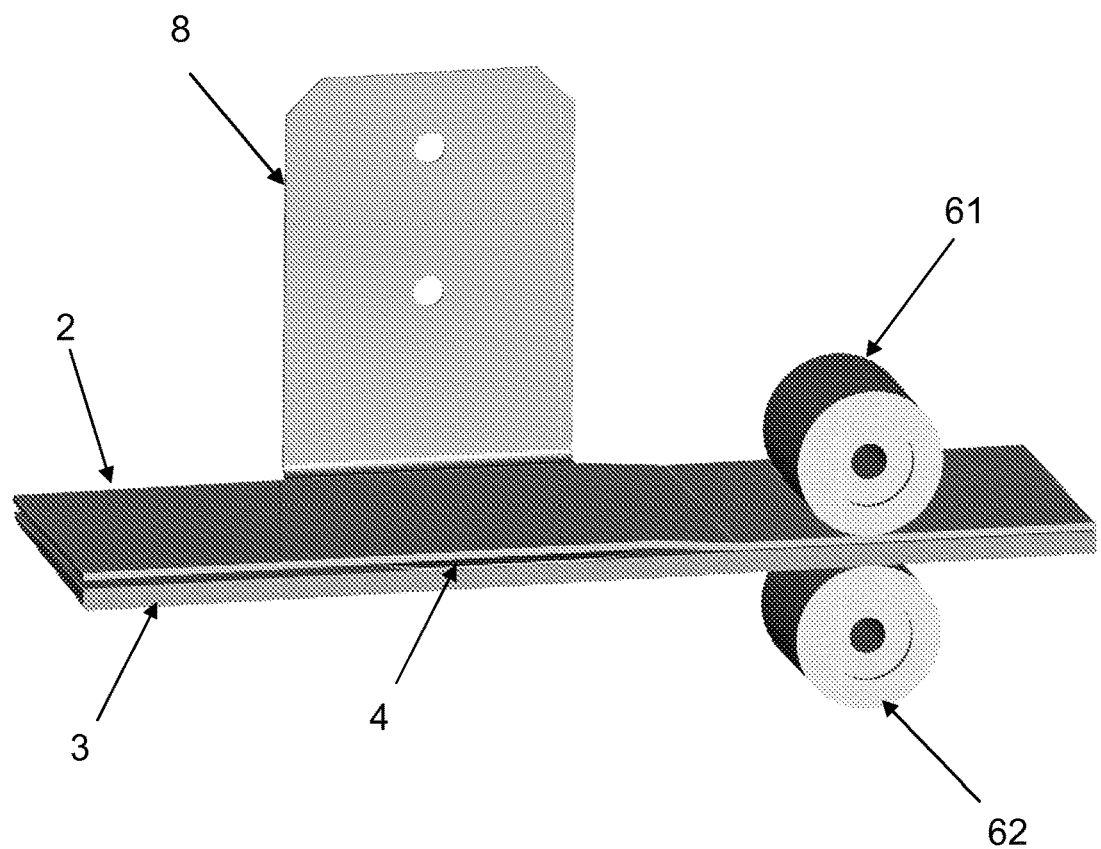
FIG. 12 gives a schematic perspective view of one embodiment of the installation of the invention, comprising two compacting rollers positioned either side of the parts to be welded according to one embodiment of the method of the invention.

For example, they may be one or more compacting rollers 6, positioned behind the insert in relation to the welding direction D. The compacting roller(s) 6 promote interpenetration of the materials softened by the temperature of the insert 4. They may also be several compacting rollers 6 optionally surrounded by a continuous track of treads 16 to ensure a certain time of maintained compacting pressure. In these embodiments, each of the compacting rollers 6 can apply pressure and/or have kinematics that are coupled between rollers or else are independent of each other. The pressure-applying elements may comprise cooling means. They may also be independently subjected to vibration at an adapted frequency e.g. ultrasonic, to facilitate welding by promoting interpenetration and macromolecular diffusion of the materials softened by the temperature of the insert 4. The vibrations can be induced by a vibrator 12. If the device comprises at least two compacting rollers, these may have the same or different diameters. These rollers may also be provided with continuous track. As illustrated in FIG. 12 (inductor not illustrated), two fixed compacting rollers 61 and 62 can be positioned either side of the mobile parts 2,3, placed opposite each other.

The pressure-applying elements may also consist of one or more pressure rollers positioned in front of the insert in relation to the welding direction D. This or these rollers ensure sufficient pressing together of the parts 2, 3. The positioning of the pressure-applying elements in front of the insert is particularly useful since the movement of the insert between the parts 2,3 causes the two parts to draw away from each other and may reduce the contact surfaces with the insert and reduce welding efficacy.

Preferably, the pressure-applying elements e.g. the compacting roller(s) 6, the compacting rollers surrounded by continuous track 16 and/or the pressure roller(s) can move independently together with travel of the insert 4, in relation to the parts to welded 2, 3, at the time of welding and in the welding direction D. In induction welding, they can be independently attached to the inductor 5. They may be independently attached to the arm 8 which comprises the insert 4.

The welding method of the invention may comprise a step to cool the welded parts by applying a heat-regulating block (not illustrated) onto at least one of the two parts 2, 3 behind the position of the insert 4 in relation to the welding direction D, or in front of the pressure-applying elements if any.

The heat-regulation block reduces the temperature of the free surfaces of the welded part relative to welding temperature, whilst maintaining the surfaces to be welded and hence the weld interface at a temperature higher than the melting point of the thermoplastic polymer.

This cooling step provides control over the temperature gradient within the welded part and limits and even prevents decompaction.

The heat-regulating block is composed of a material having suitable thermal conductivity and can be temperature-regulated e.g. via the circulation of a fluid. If the insert is heated by induction, the constituent material of the heat-regulating block can advantageously be heat-conductive and electrically insulating.

The installation 1 may also comprise a controlled-temperature chamber 14. This chamber 14 is preferably positioned behind the insert in relation to the welding direction D. A chamber can also, or alternatively, be positioned in front of the insert in relation to the welding direction D. Advantageously, at the time of welding it can move together with travel of the insert 4, in relation to the parts to be welded 2, 3, in the welding direction D. In some embodiments, the chamber 14 is attached to the arm 8 comprising the insert 4. In induction welding, the chamber 14 is also or alternatively attached to the arm 8 comprising the inductor 5. This controlled-temperature chamber 14 allows one zone of the parts 2, 3 to be held at a specific temperature e.g. to maintain one zone of the parts 2, 3 that has been softened by heating—e.g. by induction—at a recrystallization temperature to allow recrystallization under optimal conditions and to prevent post-cure of the parts after welding. It can also allow external cooling of the parts outside the welding area (and in particular outside the chamber). In addition, when heating of the surfaces to be welded 10, 11 is performed via convection, the presence of said chamber 14 can limit perturbation of convection flows.

The controlled-temperature chamber 14 can be brought to the desired temperature by blowing a fluid inside the chamber 14, preferably hot air, by means of at least one blow tube 15.

The area located outside the temperature-controlled chamber 14 can be brought to another temperature and for example can be cooled, in particular by blowing a fluid preferably cold air by means of at least one blow tube.

The controlled-temperature chamber 14 can be delimited by means of a flexible skirt e.g. in elastomer material. The flexible skirt can be secured for example to the periphery of an upper plate. With this configuration it is possible to maintain an essentially closed chamber despite any variations in height of the upper plate in relation to the parts 2, 3 and in particular it can adapt to parts 2, 3 of any shape.

The installation 1 may also comprise a second arm 9 having at its end portion a spacer element 7, optionally attached to the insert 4. The spacer element 7 is inserted between the surfaces 10, 11 to be welded of the parts 2, 3. In particular, it provides limiting of friction between the insert 4 and the parts 2, 3.

The spacer element 7 is preferably positioned in front of the insert 4 in relation to the welding direction D. At the time of welding, it can advantageously move together with travel of the insert 4, in relation to the parts to be welded 2, 3, between the surfaces 10, 11 to be welded in the welding direction D. The arm 9 comprising the spacer element 7 can be attached to the arm 8 which comprises the insert 4. In induction welding, the arm 9 comprising the spacer element 7 can also or alternatively be attached to the arm 8 which comprises the inductor 5.

The spacer element can be of double convex shape (visible in FIG. 3), in that each of its surfaces are convex.

The spacer element can also be of mixed shape, in that one surface is convex and the other is planar.

When the welding method of the invention is implemented, the insert 4 can be in contact with each of the surfaces 10, 11 to be welded of the two parts 2, 3. Alternatively, it is possible that the insert may not be in contact with at least one of the surfaces 10, 11 to be welded of the two parts 2, 3, in particular it may not be in contact with any of the surfaces 10, 11 to be welded of the two parts 2, 3.

Heating of the surfaces 10, 11 to be welded can therefore be obtained via conduction and/or via convection and/or via radiation from the insert 4. The installation 1 may also comprise at least one pyrometer (not illustrated). When implementing the welding method of the invention, the pyrometer continually or at point times measures the temperature of the parts to be welded in the weld area. The pyrometer is preferably positioned at the insert 4 in relation to the welding direction D.

The pyrometer is preferably positioned on one of the edges of the parts to be welded 2, 3 or alternatively a pyrometer is positioned on each of the edges of the parts to be welded 2, 3, in particular when the width of the insert is at least equal to the width of the overlap area of the parts to be welded 2, 3. The method of the invention allows controlled, homogeneous warm-up of the parts to be welded 2, 3 in the weld area. Measurement of temperature at one of the edges, or at both edges, is sufficient and allows extrapolating of the temperature over the entire weld area.

Alternatively, or additionally, a pyrometer can be positioned at the free surface of one of the two parts, at any point of the weld area, in particular if the width of the insert only represents a portion of the width of the overlap area of the parts to be welded 2, 3.

The pyrometer can also measure the temperature of the insert 4 on the edge of the parts to be welded.

Preferably, the insert 4 and the pyrometer, at the time of welding, move together in relation to the parts to be welded 2, 3, in the welding direction D. It can be attached to the arm 8 comprising the insert 4.

The installation may comprise a multi-weld device.

In one embodiment, the multi-weld device can allow the simultaneous welding of at least three parts to be welded. Said device in particular may comprise at least two inserts, positioned at the same level or offset from the direction of welding. These multiple inserts respectively allow the welding of the first part and the second part, the welding of the second part and the third part etc., and juxtaposing thereof. In another embodiment, the multi-weld device may allow the welding of two parts at two separate points of the overlap area. Said device may particularly comprise at least two inserts positioned at the same level in relation to the welding direction and with certain spacing therebetween. Each insert allows the welding of one portion of a first part and of a second part. After welding, only some portions of the overlap area of the two parts will be welded together, the other portions not being welded. In induction welding, the same result can be obtained by positioning a wide insert over the entire surface of the parts to be welded and by applying heat via several inductors providing localised heating and which travel above the part to be welded.

Figure 5:
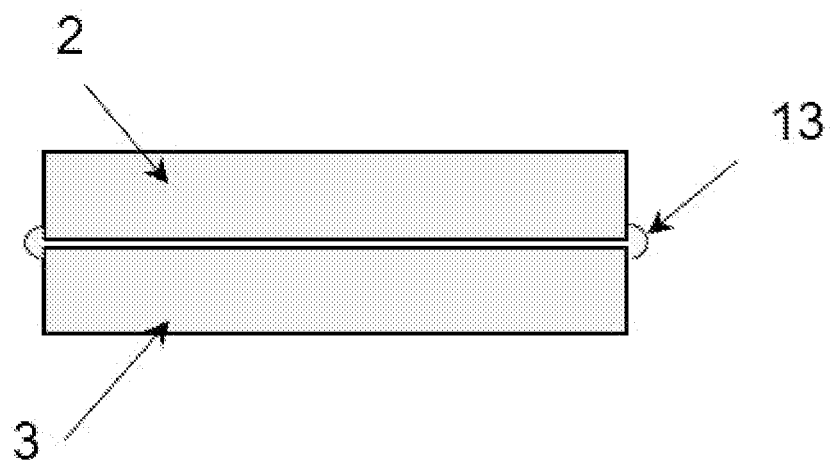
FIG. 5 gives a schematic view of two parts welded according to one embodiment of the method of the invention.

The welding method of the invention may comprise the formation of a bead (meniscus) 13 of thermoplastic material at the end of the weld interface (visible in FIG. 5). The formation of this bead (meniscus) is made possible since the method of the invention allows heating of the surfaces to be welded 10, 11 and hence softening of the thermoplastic material of the parts 2, 3 as far as the end portion of these surfaces to be welded 10, 11 (in particular by adapting the dimensions of the insert 4 to the surfaces to be welded 10, 11, the insert 4 therefore being able to extend as far as one or more ends of the surfaces to be welded 10, 11, even to extend beyond one of more ends of the surfaces to be welded 10, 11). The presence of a bead (meniscus) 13 at the end of the weld interface allows limiting of the risk of incipient crack formation. In an induction welding method based on heating the carbon fibres of the composite parts to be welded, the creation of current loops close to the end portions of the weld interface is not possible, generally resulting in welds of lesser mechanical strength at these points.

In some embodiments, the part 3 the furthest distant from the inductor 5 is a multilayer structure having a conductive element as outer layer or as part of the outer layer (i.e. the layer the furthest distant from the surface 11 to be welded). The conductive element may particularly be a metal mesh e.g. in copper or bronze. The presence of this conductive element is particularly advantageous for the manufacture of fuselages in the aeronautics sector, this element providing aircraft with protection against lightening. The method of the invention has the advantage that it is able to use localised heating at the interface between the two parts to be welded. For example, for heating via induction, it is possible to weld the parts 2, 3 without the magnetic field reaching the conductive element being sufficient to induce major heating of this element, preventing local degradation of the part through overheating of this conductive element. In addition, the method of the invention prevents the conductive element from capturing a large part of the effect of the magnetic field, which otherwise would result in insufficient heating of the surfaces to be welded.

Movement of the insert 4 and/or inductor 5 (for induction welding) and/or of the pressure-applying elements and/or controlled-temperature chamber 14 and/or the spacer element 7 can be obtained in automated fashion via one or more robots, or else manually by an operator. In particular, for induction welding, the insert 4 and the inductor 5 can be moved together by the same robot.

The weld temperature is a function of the temperature of the insert 4.

For induction, the temperature of the insert 4 is itself dependent on the power and frequency of the magnetic field delivered by the inductor 5, on the travel speed of the insert 4 (e.g. together with the inductor 5) and on the distance between the inductor 5 and the insert 4.

In some embodiments, the inductor 5 generates a magnetic field having a frequency of 10 Hz to 2 MHz, preferably 80 Hz to 300 kHz, more preferably 100 Hz to 200 kHz.

In some embodiments of induction welding, the distance between the inductor 5 and the insert 4 remains constant throughout welding. In other embodiments, this distance can vary, in particular if at least one of the parts to be welded 2, 3 is of varying thickness.

In some embodiments, the method of the invention comprises a step to control the temperature of the insert 4 (by means of a thermocouple or any other suitable temperature sensor) and a step for instant regulation of this temperature in particular by adjusting the travel speed of the insert 4, and/or the power of the magnetic field delivered by the inductor 5, or the electrical power in the event of resistive heating and/or any other relevant parameter e.g. via a conventional feedback loop.

Thermal regulation of the insert has the advantage of allowing the surfaces to be welded to be brought to a required temperature, adapted for assembly by welding. Several regulating modes can be applied.

For example, one regulating mode may obtain thermal regulation by measuring the temperature of the insert 4 with a device of laser pyrometer type. After previously quantifying the temperature difference between the control area accessible during welding (edge of insert 4, in the vicinity of the parts 2,3) and the surfaces of the insert 4 in contact with the surfaces to be welded (inaccessible during the welding phase), the power of the heating device such as the induction generator for heating via a magnetic field, or the current generator for resistive heating, can be servo-controlled by the temperature of the insert 4 that is accessible during the conventional welding phase.

Another regulating mode for the induction welding method can be the use of material having a Curie temperature to fabricate the insert 4. The Curie point of a material significantly modifies the sensitivity thereof to a magnetic field and to induction phenomena. In this mode, two configurations in particular can be used. One configuration is the capacity of the material not to be heated by induction beyond this particular point (halting of phenomena of induced current and magnetic dipoles). In this case, thermal regulation of the insert is physically ensured as soon as the Curie point is crossed. However, if heating by induction still occurs beyond this point (e.g. persistent induced current) the significant change in sensitivity to the magnetic field of the material at the Curie point (e.g. magnetic permeability) can be detected by an adapted sensor and placed in the environment of the welding device; this sensor provides indication that the Curie point has been reached allowing electronic regulation of heating to be initiated ensuring servo-control of generator power. The parameter detected in the environment of the welding device can be the intensity of the surrounding magnetic field (e.g. Hall effect sensor) affected by sudden changes in the characteristics of the material of the insert 4 to magnetic phenomena. Detection of a parameter of the environment could also entail variation in the impedance of the insert 4 coupled to the inductor.

Said embodiments are particularly advantageous for the assembly of fuselage parts in the aeronautics sector, since control over welding temperature is required for qualification of an aeronautic process.

Another regulation mode for the welding method via resistive effect can involve measurement of the resistivity of the insert. Measurement of resistivity, dependent on temperature, will allow servo control over the value of the current passing through the insert 4.

The method of the invention may also comprise a step to record temperature values of the insert 4 and/or travel speeds of the insert 4 and/or the magnetic power delivered by the inductor 5, and/or the pressure applied to the parts to be welded 2, 3 and/or any other parameter. This is particularly advantageous for the production of fuselages in the aeronautics sector for which the recording of these data is required for qualification of an aeronautic process.

The welded parts 2, 3 of the invention can particularly be aircraft fuselage parts, such as fuselage skin parts, frames or stringers.

Alternatively, these parts can be aerospace or automotive parts, or parts for sports equipment.

The method of the invention can also be applied to the welding of tarpaulins whether or not structural, in particular in the field of civil engineering and water sports (mooring tarpaulins, boat sails . . . ).

EXAMPLES

The following examples illustrate the invention but are nonlimiting.

In Examples 1 to 4, when producing at least one of the parts to be welded using ATL technology (Automated Tape Lay-up), the first deposited layer is a UD-Tape layer, the composition of which differs from that of the other constituent layers of the composite part.

Example 1

The composition of the first layer is 50 weight % PEKK Kepstan® 7002 and 50 weight % carbon fibres. The composition of the other layers is 34 weight % PEKK Kepstan® 7002 (marketed by Arkema) and 66 weight % carbon fibres.

In this example, the higher percentage of thermoplastic material in the first layer facilitates welding without changing the method for producing the parts, and imparts this first layer with creep under compacting pressure allowing a meniscus to be obtained at the end portion of the weld interface. In addition, said first layer can compensate for some defects in the surfaces to be welded.

Example 2

The composition of the first layer is 34 weight % PEKK Kepstan® 6002 (having a melting point of 303° C.) and 66 weight % carbon fibres. The composition of the other layers is 34 weight % PEKK Kepstan® 7002 (marketed by Arkema) (having a melting point of 333° C.) and 66 weight % carbon fibres.

The parameters of the method can be adapted so that the temperature of the insert allows melting of the thermoplastic material of the first layer without melting that of the other layers.

Alternatively, the constituent material of the insert comprises ferromagnetic material having a Curie point such that the «ceiling» temperature of the insert (and of its environment in the method) guarantees melting solely of the first layer.

Example 3

The composition of the first layer of the part is 50 weight % polyamide and 50 weight % glass fibres. The composition of the other layers is 34 weight % polyamide and 66 weight % glass fibres.

Example 4

The composition of the first layer is 34 weight % of a first polyamide having a particular melting point and 66 weight % glass fibres. The composition of the other layers is 34 weight % of a second polyamide having a higher melting point than the first polyamide, and 66 weight % glass fibres.

Example 5

In these first feasibility validation tests, a foil of thickness 0.8 mm was used as insert. The substrates to be welded were composed of a PPS matrix comprising a woven carbon fabric, and substrate thickness was 1.5 mm. A ply of woven glass fabric in a PPS matrix was placed at the weld interface to provide a non-conductive material at the interface.

Welding was performed according to the method of the invention. Welding was effective and it was observed that the assembly obtained is cohesive.

This example allowed verification that the welding of the invention is indeed obtained by means of heating the insert, and not solely on account of the presence of conductive fibres in the parts to be welded.

The weld interfaces were fully interpenetrated, and, after analysis of the weld joint, cohesive rupture of the thermoplastic matrix was observed.

Example 6—Weldability Via Induction of Non-Electrically Conductive Substrates The parts to be welded were semi-finished products marketed under the trade name Polystrand™ IE 7034B by PolyOne, corresponding to a polypropylene unidirectional thermoplastic tape. These semi-finished products comprise 70 weight % glass fibres, have a thickness of 0.25 mm/semi-finished product and gram weight of 354 g/m². The thickness of the parts to be welded was 3 mm.

Two parts were welded using an industrial robot marketed by Kuka, and a current generator for inductor marketed by CEIA.

The welding parameters applied were the following:
Frequency: 200 kHz;
Material of insert 4: Steel;
$P_{max}$ limited to 20% of 12.5 kW;
Distance between inductor and substrate: 5 mm;
Welding temperature: about 200° C.,
Travel speed of insert relative to the parts to be welded: 3.3 mm·s$^{-1}$.

The shear stress (τ) of the welded product was 11.8 MPa, namely 97% of the reference shear stress (part without weld) according to standard prEN 6060, the reference (100%) being performed according to the same standard on 5 test specimens.

Example 7—Weldability by Induction of PEKK and Carbon Fibre Substrate

The parts to be welded were semi-finished products comprising PEKK having a melting point of 333° C. and carbon fibres. These materials underwent a consolidation step in an autoclave and lay-up as follows:
Orientation sequence (orientation in each fibre layer)+ 45°, 0°, −45°, 90°, repeated 6 times with a plane of symmetry at the third repeat;
Volume percent of fibres (VPF) in substrates to be welded: 60%+/−2%;
Volume percent of fibres (VPF) in added interface material: 35%; 150 μm.

The added interface material was a unidirectional web positioned on the surface to be welded so that the fibres are oriented at 0° in relation to the welding direction. The thickness of the parts to be welded was 4.4 mm.

Two parts were welded using an industrial robot marketed by Kuka, and a current generator for inductor marketed by CEIA.

The welding parameters applied were the following:
Frequency: 200 kHz;
Material of the insert 4: Steel;
$P_{max}$ limited to 30% of 12.5 kW;
Distance between inductor and substrate: 5 mm;
Welding temperature: 465° C.,
Travel speed of insert in relation to the parts to be welded: 3.3 mm·s$^{-1}$.

The shear stress (τ) of the welded product was 35 MPa, corresponding to a shear stress close to that of the material of the parts 2, 3.

Example 8—Temperature Guiding (or Thermal Regulation Mode) in the Weld Area Via Measurement and Regulation (Differing from the One Envisaged with the Curie Point Material of the Insert 4)

The temperature at the weld area was tested using a pyrometer of reference SH15/SLE by CEIA.

At a first test, a rectilinear groove was made in the middle of the free surface of one of the two parts to be welded, in the welding direction. A first pyrometer was placed in this groove and a second side pyrometer was placed on the edge of the parts to be welded, in the continuation of the insert. The pyrometers were moved together with the insert. This test showed that the welding temperatures respectively measured by the first pyrometer placed in the groove and the second pyrometer are coherent (constant difference).

At a second test, the pyrometer was placed solely on the edge of the parts to be welded, in the continuation of the insert. The pyrometer was moved together with the insert.

These tests show that the use of a single pyrometer placed on the edge of the parts to be welded and at the insert is sufficient to control and guide the temperature of the weld area. They also showed the need for a thermal regulation mode of the static susceptor (before setting the robot in operation) that is dynamic, independent and adapted.

Example 9—Measurement of the Temperature of the Insert

The materials and conditions were the same as in Example 7.

At the groove test, a temperature on the edge of insert was observed of 490° C. for a temperature in the centre of the groove of 465° C.

Welding operations were then performed (without grooves) with a temperature on the edge of the insert 4 of 490° C.

Example 10—Indifferent Distance Between the Substrate and Inductor

The parts to be welded were semi-finished products marketed under the trade name Polystrand™ IE 7034B by PolyOne, corresponding to a unidirectional polypropylene-based thermoplastic tape. These semi-finished products comprise 70 weight % glass fibres, have a thickness of 0.25 mm/semi-finished product and gram weight of 354 g/m². The thickness of the parts to be welded was 2 mm.

Two parts were welded (cf. the devices in Example 6).
The welding and control parameters applied were the following:
Frequency: 200 kHz;
Material of the insert 4: Steel;
$P_{max}$ limited to 25% of 12.5 kW;
Distance between inductor and substrate: 5 mm, 10 mm and 15 mm;
Welding temperature: about 180° C.

These tests show that it is possible to maintain a constant regulated temperature of the susceptor, irrespective of inductor/substrate distance. The effective power of the generator adapts and increases with the distance under consideration.

These tests further show that, for the tested material, the temperature of the outer surface (free upper surface) is 110 to 120° C. under steady conditions, hence well below the melting point of the polypropylene matrix, irrespective of the distance between the inductor and substrate.

These tests were duplicated on woven carbon/PPS composites of thickness 1.8 mm (reference CETEX TC1100 by Tencate): the conclusions were the same with inductor/substrate distances of 10, 12 and 15 mm. The regulated temperature was 300° C., surface temperature stabilised at 245° C.

The invention claimed is:

1. A method for welding at least two rigid parts comprising a thermoplastic material and having respective surfaces to be welded, comprising:
    inserting an insert between the surfaces to be welded of the two rigid parts, said insert having a thickness of 5 mm or less;
    providing heat via said insert;
    wherein the insert moves in relation to the two rigid parts to be welded at the time of welding, in a welding direction; and
    wherein the insert comprises an induction-sensitive material, and the heat of the insert is provided by the generation of a magnetic field by at least one inductor.

2. The method according to claim 1, further comprising the contacting of the surfaces to be welded of the two rigid parts to be welded by applying pressure onto at least one of the two rigid parts upstream and/or downstream of the position of the insert in relation to the welding direction.

3. The method according to claim 1, wherein the insert is in contact with each of the surfaces to be welded of the two rigid parts.

4. The method according to claim 1, wherein at least one of the two rigid parts is made of composite material comprising reinforcing fibres in a matrix of thermoplastic material.

5. The method according to claim 1, wherein the thermoplastic material is selected from the group of polyamides, polyimides, polyaryletherketones and polyetheretherketones, polyethylene terephthalate, polyolefins, phenylene polysulfide, polysulfones, chlorinated polymers, acrylic or methacrylic polymers.

6. The method according to claim 1, wherein at least one of the two rigid parts, are a multilayer structure.

7. The method according to claim 1, wherein the two rigid parts are aircraft fuselage parts.

8. An installation for welding at least two rigid parts comprising a thermoplastic material and having respective surfaces to be welded comprising:
    a support to hold the two rigid parts to be welded;
    an arm comprising at its end portion a heating insert having a thickness of less than 5 mm, configured to be inserted between the surfaces to be welded of the two rigid parts;
    the insert being configured to move in relation to the two rigid parts to be welded at the time of welding, in a welding direction; and wherein the heat-generating device is at least one inductor, and said insert comprises an induction-sensitive material.

9. The installation of claim 8, further comprising one or more compacting rollers and/or one or more pressure rollers.

10. The installation according to claim 9, wherein the compacting roller(s) are configured to be subjected to vibration at an adapted frequency.

11. The installation according to claim 8, wherein the support is configured to be heated.

12. The installation according to claim 8, comprising a controlled-temperature chamber.

13. The installation according to claim 12, wherein the controlled-temperature chamber comprises a flexible skirt.

* * * * *